United States Patent
Peeters et al.

[11] Patent Number: 6,038,844
[45] Date of Patent: Mar. 21, 2000

[54] FOLDING HAY RAKE WITH EXTENSION LINKAGE

[75] Inventors: Kenneth J. Peeters, Bear Creek; Gregory L. Landon, Shawano, both of Wis.

[73] Assignee: H&S Manufacturing Co., Inc., Marshfield, Wis.

[21] Appl. No.: 09/002,653

[22] Filed: Jan. 5, 1998

[51] Int. Cl.[7] .................................................. A01D 57/12
[52] U.S. Cl. .................................. 56/377; 56/385
[58] Field of Search ........................ 56/377, 367, 372, 56/380, 384, 385, 228, DIG. 10, DIG. 21, 376, 341, 366, 365

[56] References Cited

U.S. PATENT DOCUMENTS

| | | |
|---|---|---|
| 2,222,840 | 11/1940 | Holmes . |
| 2,906,351 | 9/1959 | Johnson . |
| 3,466,860 | 9/1969 | Winkel et al. . |
| 3,977,166 | 8/1976 | Delgado . |
| 4,231,218 | 11/1980 | Delgado . |
| 4,723,401 | 2/1988 | Webster . |
| 4,723,402 | 2/1988 | Webster . |
| 4,723,403 | 2/1988 | Webster . |
| 4,785,614 | 11/1988 | Schoenherr . |
| 4,932,197 | 6/1990 | Allen . |
| 4,947,631 | 8/1990 | Kuehn . |
| 5,062,260 | 11/1991 | Tonutti . |
| 5,065,570 | 11/1991 | Kuehn . |
| 5,199,252 | 4/1993 | Peeters . |
| 5,305,590 | 4/1994 | Peeters . |
| 5,540,040 | 7/1996 | Peeters . |
| 5,598,691 | 2/1997 | Peeters . |

FOREIGN PATENT DOCUMENTS 1247445  10/1959  France .

*Primary Examiner*—Robert E. Pezzuto
*Attorney, Agent, or Firm*—Patterson & Keough, P.A.

[57] ABSTRACT

A rake arm deployment spreader with two arms and an elbow member arrangement, optionally and preferably having a locking mechanism involving an overcenter arrangement of certain pivots, for deployment or retraction of a folding hay rake which is towable by a tractor. The hay rake has a primary towable frame with right and left secondary frames pivotally attached adjacent the rear of the primary frame. The deployment spreader assembly is pivotally attached to the primary and secondary frames for pivoting the secondary frame relative to the primary frame. The deployment spreader includes a telescopic arm and a leg and link to control the telescopic arm.

5 Claims, 15 Drawing Sheets

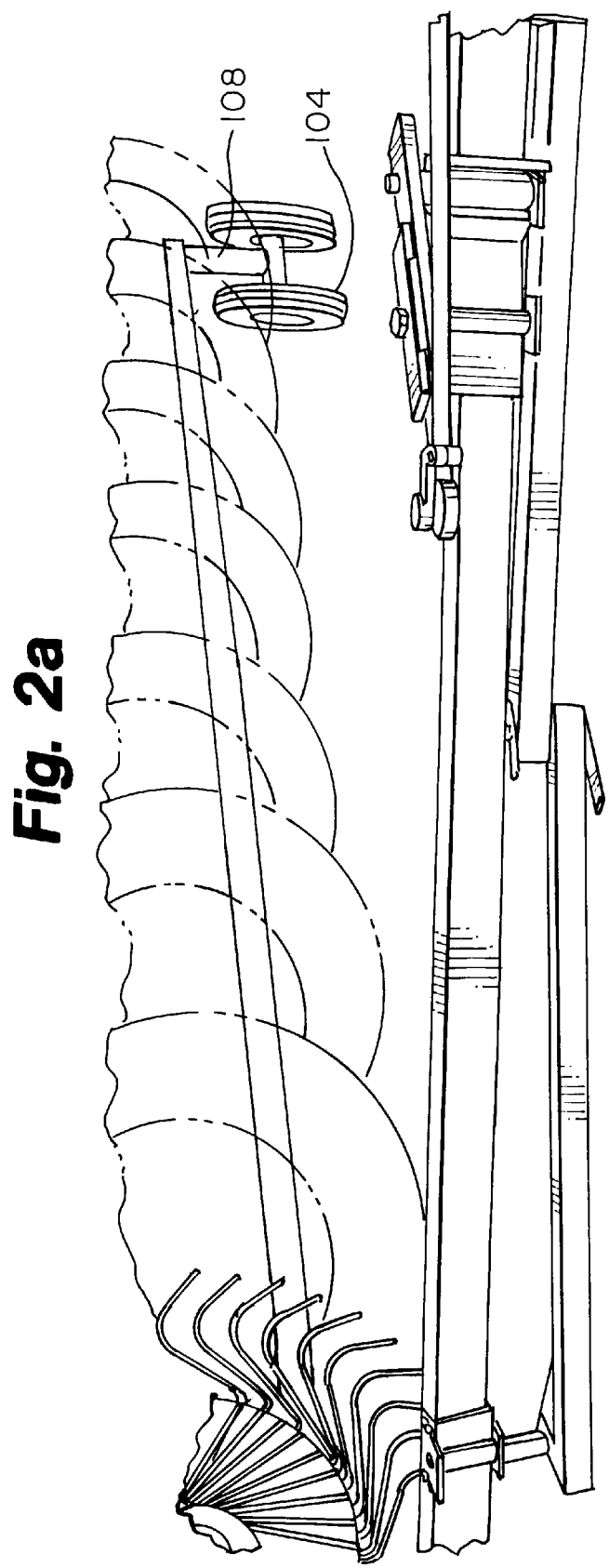

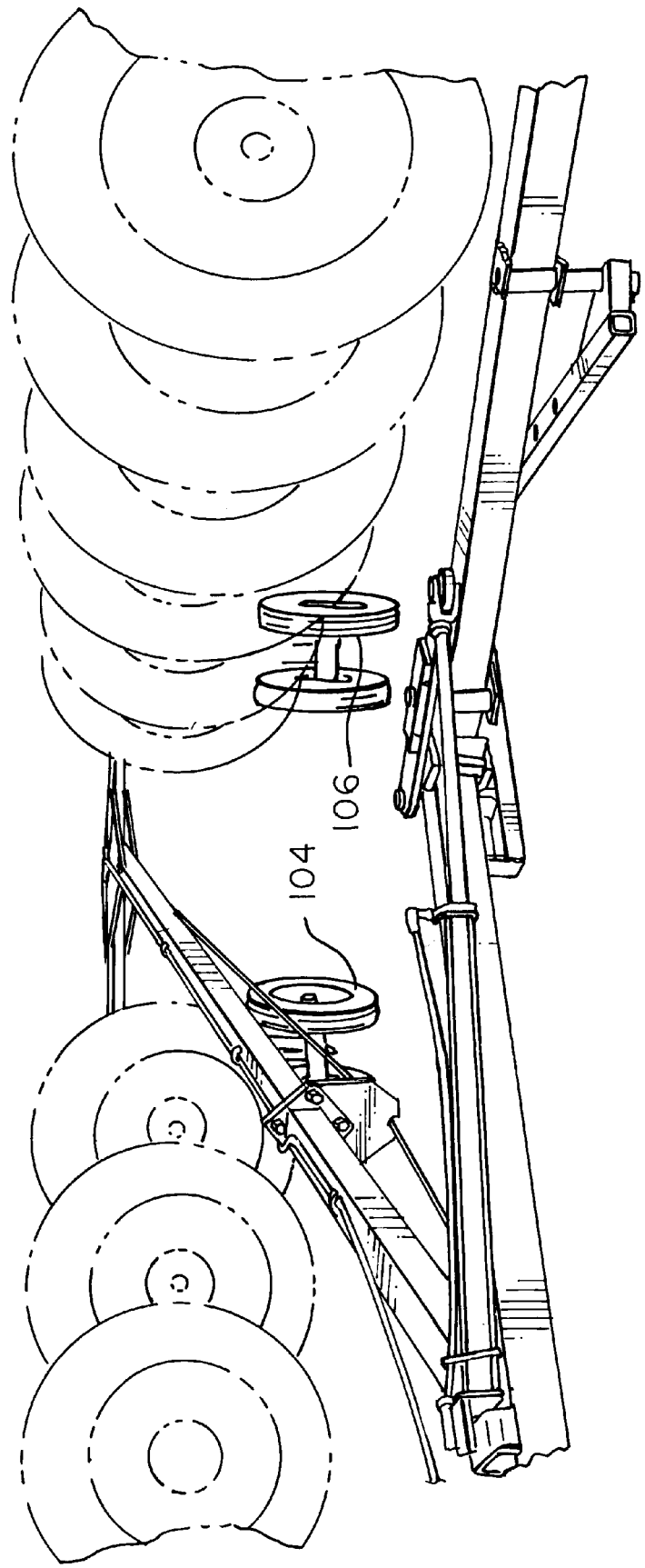

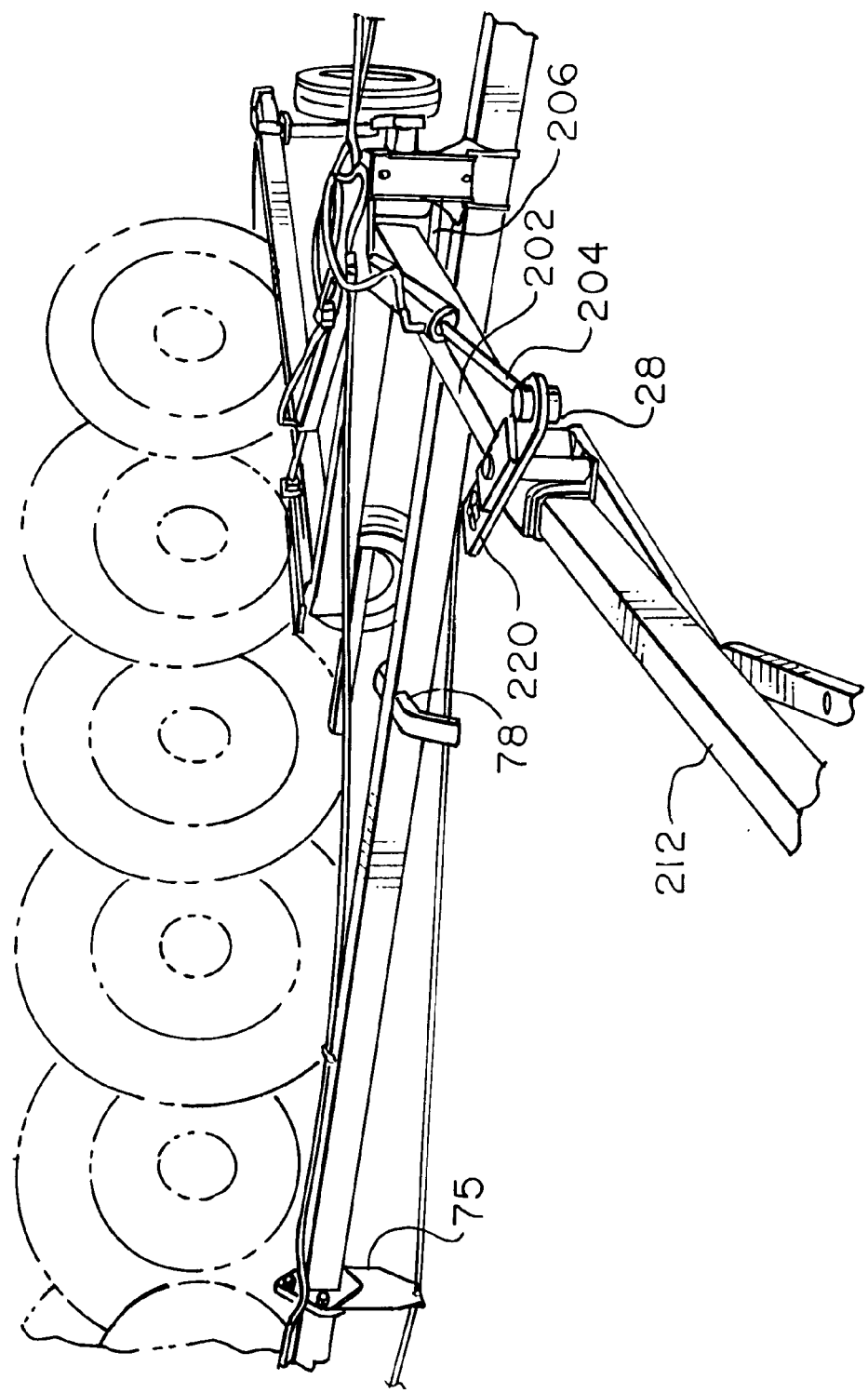

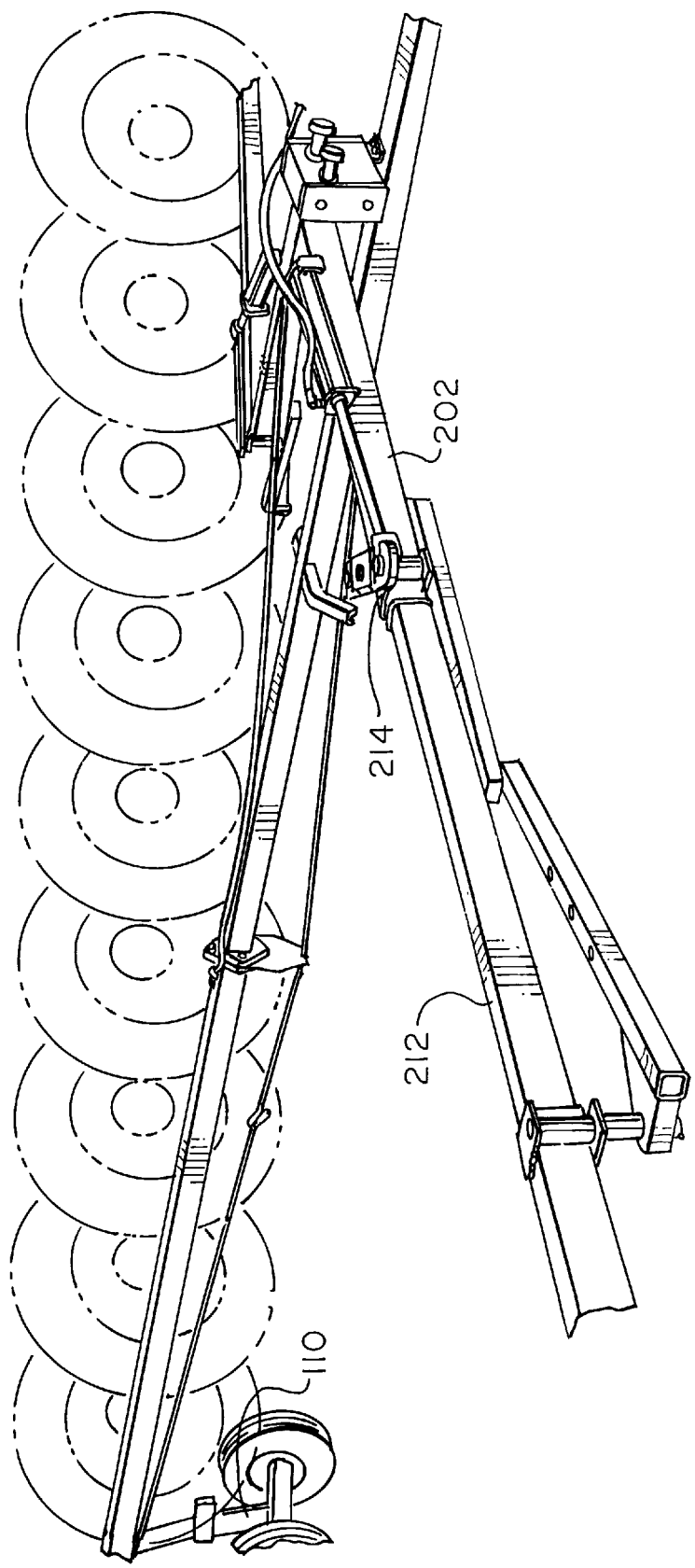

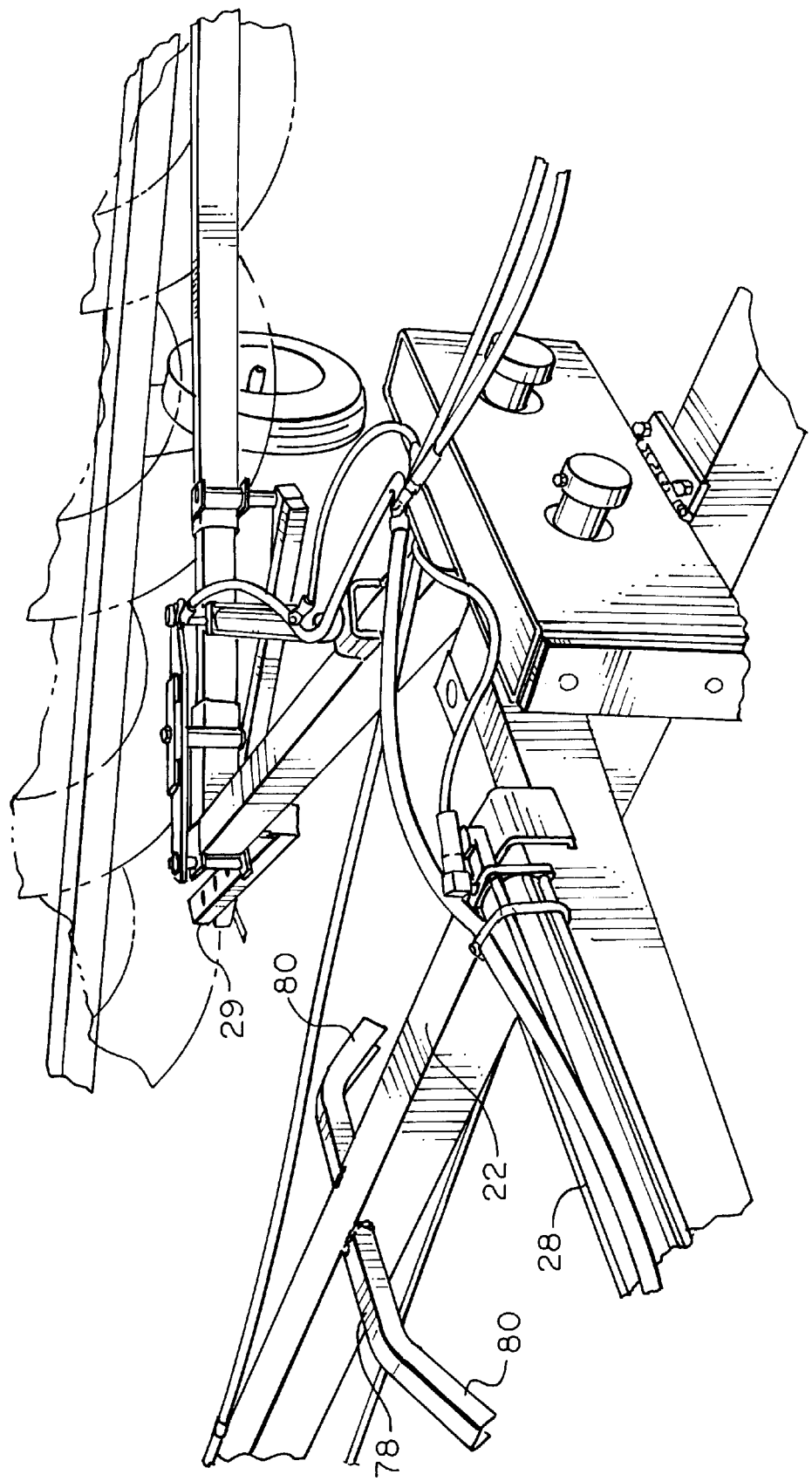

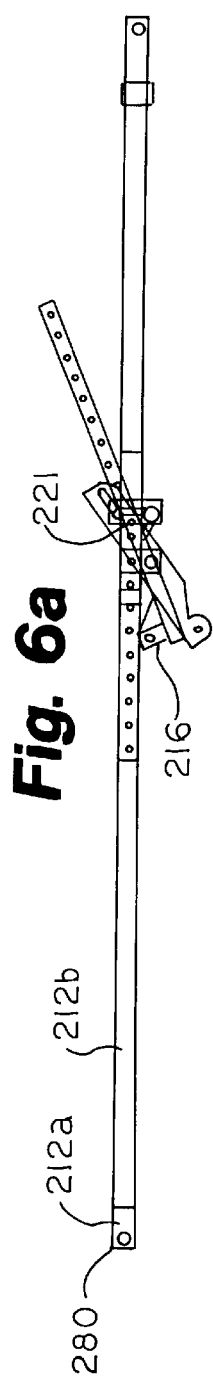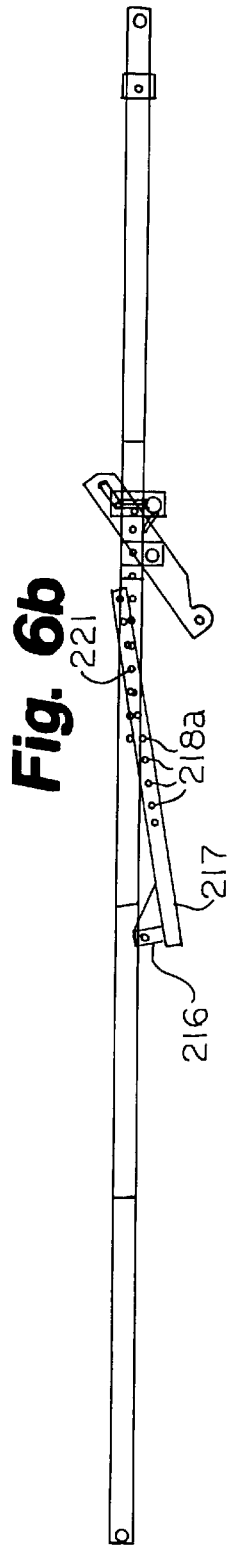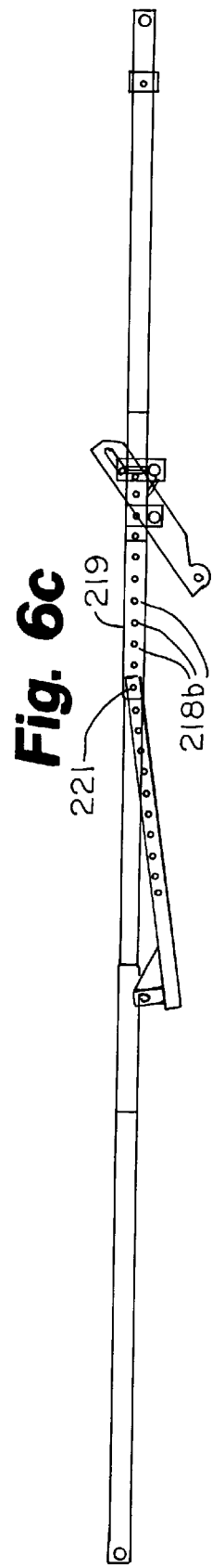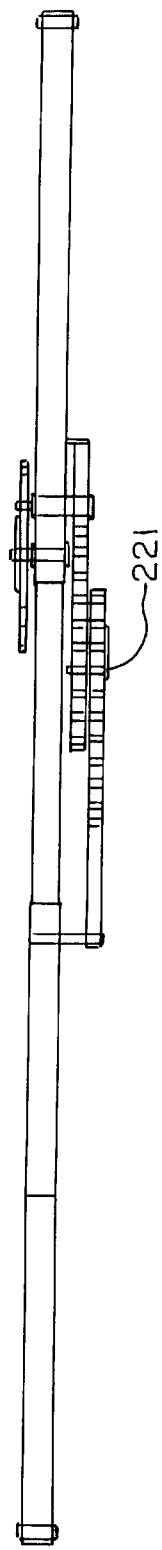

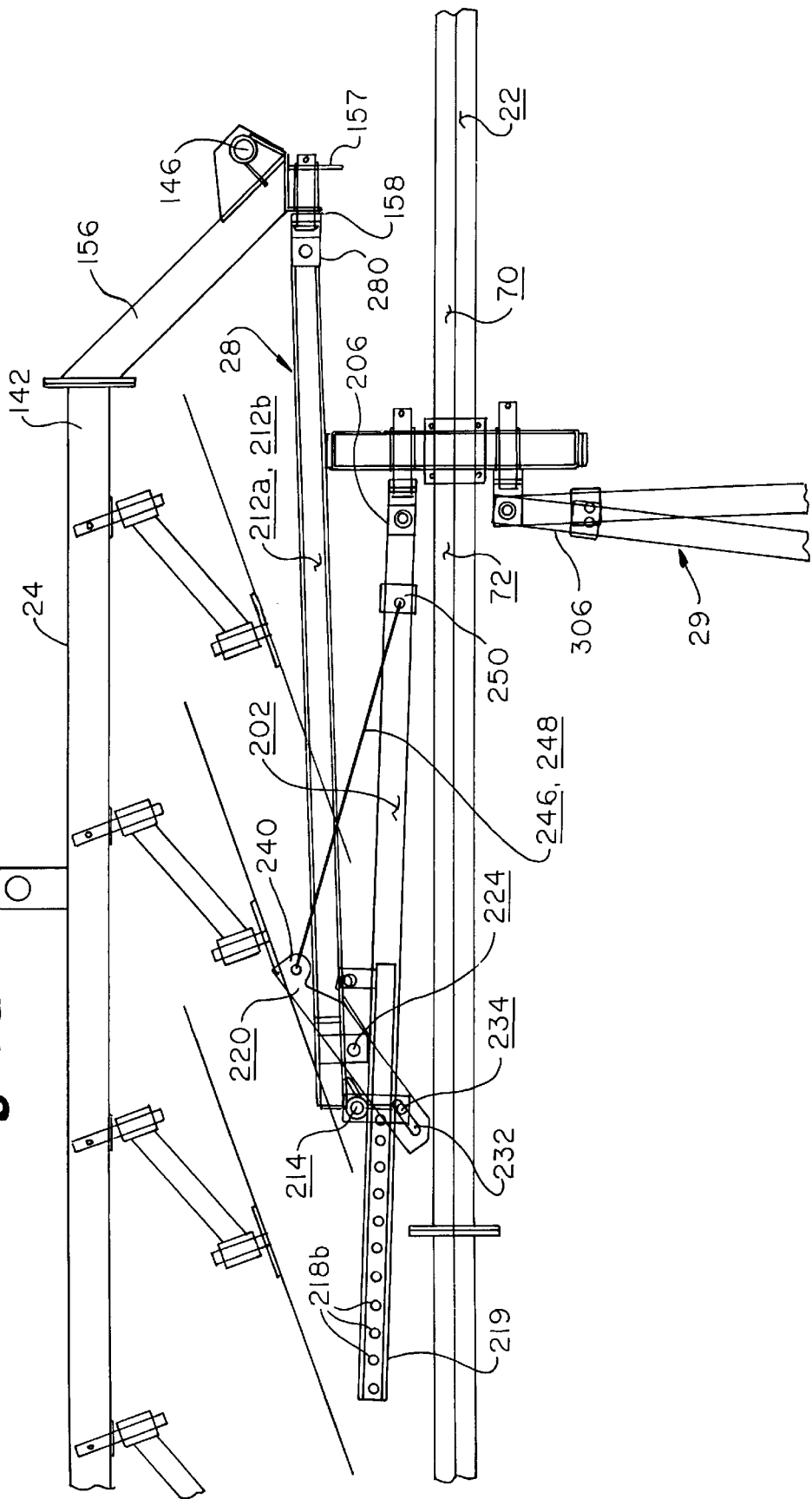

FOLDING HAY RAKE WITH EXTENSION LINKAGE

CROSS REFERENCE TO OTHER APPLICATIONS

This application is based in part upon the disclosure filed Mar. 1, 1995, Folding Hay Rake, Ser. No. 08/397,427, issued Jul. 30, 1996 as U.S. Pat. No. 5,540,040, the entire disclosure of which is hereby incorporated by reference.

BACKGROUND

The present invention relates to agricultural implements and, in particular, the present invention relates to towable folding wheel rakes useful to form windrows from cut forage and most particularly to extension linkage useful in towable folding wheel rakes.

For many years it has been a typical agricultural process to cut forage, allow some drying to occur, rake it into piles where some additional drying occurs, collect and store it at a desirable moisture content, and subsequently feed such stored, dried forage to livestock. Weather conditions between the time of cutting and collecting play a major role in determining the resulting quality of the product of this agricultural process. In modern times, as farms have grown dramatically in area and the work force reduced in number, the process has been altered to employ power equipment to rake the drying cut forage into long, continuous windrows, which also encourages drying. The windrows may or may not be formed into bales prior to collection. Weather continues to be a major determinant of the overall outcome and the capability to rapidly rake a large field area in a short time is often critical.

Most modern power equipment for raking cut forage employs rotating tined wheels and most particularly banks of rotating tined wheels which are moved through a field of cut forage to form windrows. These banks of wheel rakes and more importantly multiple banks of wheel rakes can be quite wide to reduce both the time and pathway required to rake a field. Wide rakes thereby offer a potential time and cost savings to agriculture and enhance the opportunity to perform the raking process so as to best utilize favorable weather conditions.

In designing agricultural implements, such as wide hay rakes, relatively minimal frame members sizes are preferred over massive frame members to avoid increased manufacturing cost and increased implement weight. A more expensive implement which requires more fuel input to a larger tow vehicle for operation due to increased weight would sacrifice some of the potential efficiency of wide rakes.

An additional engineering challenge concerns the transport wide rakes between fields. In response to the transport challenge, wide rakes which fold to facilitate transport over highways and through fence gates have become popular in recent years. Peeters in U.S. Pat. Nos. 5,199,252 and 5,305,509 discloses an exemplary folding hay rake. The Peeters rake involves a towable primary transport frame with right and left secondary frames, each having a bank of wheel rakes, pivotally deployed from the rear end of the primary frame by action of a telescoping extension assembly.

Practical and economical pivoting of the secondary frames relative to the primary frame can represent a considerable engineering challenge. The telescoping extension approach of Peeters requires either a very long hydraulic cylinder and ram attached well away from the pivot connection between the primary and secondary frames, or in the alternative, a short, very powerful cylinder and ram, situated close to the pivot connection between the primary and secondary frame.

Each of these two telescopic deployment approaches have certain disadvantages. A long hydraulic cylinder and ram are subject to vibration which might damage relatively thin hydraulic components. Therefore, long hydraulic components must be of a sufficient diameter, often greater than required for mere deployment, in order to withstand the jarring and shock encountered in raking a hay field. Such long and large hydraulic units tend to be relatively heavy and expensive, both undesirable qualities in a folding hay rake. Even short, powerful hydraulic units, mounted near the frame pivot, require heavy mounts and heavier, more massive primary and secondary frames to transmit the hydraulically imparted motion to the end of the secondary frame and its supporting caster wheel. Again, this solution tends away from the desirable objectives of light weight and low capital cost for a folding hay rake.

The present invention provides an ingenious solution to pivotally extending or retracting a secondary frame on a folding wheel rake, while avoiding the above mentioned long or short hydraulic telescopic deployment systems and further incorporating a convenient adjustment of the full extension of the deployment. As in the previously mentioned Peeter's invention entitled Folding Hay Rake, the present invention is compatible with the use of relatively fine frame members on the agricultural implement, which tends to minimize the implement's weight and does not result in excessive increases in manufacturing costs. The agricultural implement of this invention therefore allows even better exploitation of the potential efficiency of a wide folding wheel rake. Further, other aspects of the present invention provide versatility and more precise fine adjustments in forage raking operations.

SUMMARY OF THE INVENTION

The present invention involves a clever arrangement for deploying a wide folding hay rake through the use of a deployment spreader with two arms, an elbow member arrangement, and an extension adjustment and control mechanism. In a most preferred embodiment, the deployment spreader incorporates a locking mechanism involving an overcenter arrangement of certain pivots which works in combination with the extension adjustment and control mechanism.

In a first embodiment, a folding hay rake includes a primary frame, a secondary frame pivotally attached to the primary frame adjacent the rear end, and a deployment spreader device. The deployment spreader device is pivotally attached to the primary and secondary frames, for pivoting the secondary frame relative to the primary frame. The deployment spreader device includes: a first arm, a telescopic second arm pivotally connected to the first arm, an elbow member slidably and pivotally attached to the first arm and pivotally attached to the second arm, means for moving the elbow member to pivot the first arm relative to the second arm, and means for controlling the telescopic second arm. Preferably, the secondary frame has a mirror image secondary frame on an opposite side of the primary frame but separately controllable. Preferably, the deployment spreader includes an overcenter condition when the first arm and the second arm are co-aligned. Preferably, control of the telescopic secondary arm also involves selectable successive pairs of pin receiving holes arrayed respectively upon a leg and link combination of the deployment spreader means.

BRIEF DESCRIPTION OF THE DRAWINGS

FIGS. 2a and b are detailed fragmentary perspective views thereof, as viewed from an elevated location above the front and showing portions of the left extension arm;

FIGS. 3a, b, and c are a fragmentary perspective views from the right side thereof;

FIGS. 6a, b and c are fragmentary bottom views of the right deployment assembly in extended position and showing narrow, intermediate and wide positions; FIG. 6d is a fragmentary front view of the intermediate position shown in FIG. 6b.

DETAILED DESCRIPTION

Comprehension of the present invention can be gained through reference to the drawings in conjunction with a through review of the following explanation. In order to facilitate a full appreciation of the invention, an overview of the preferred embodiment is initially provided. The overview is followed by more detailed explanation. By "forage" herein is meant not only food for livestock such as horses and cattle, such as hay, but also similar materials, such as straw, which might be used for bedding rather than food. By "overcenter" herein is meant a condition in which three pivots are moved into a geometric linear alignment with each other and then proceed slightly past the geometric linear alignment condition.

Figure 1A:
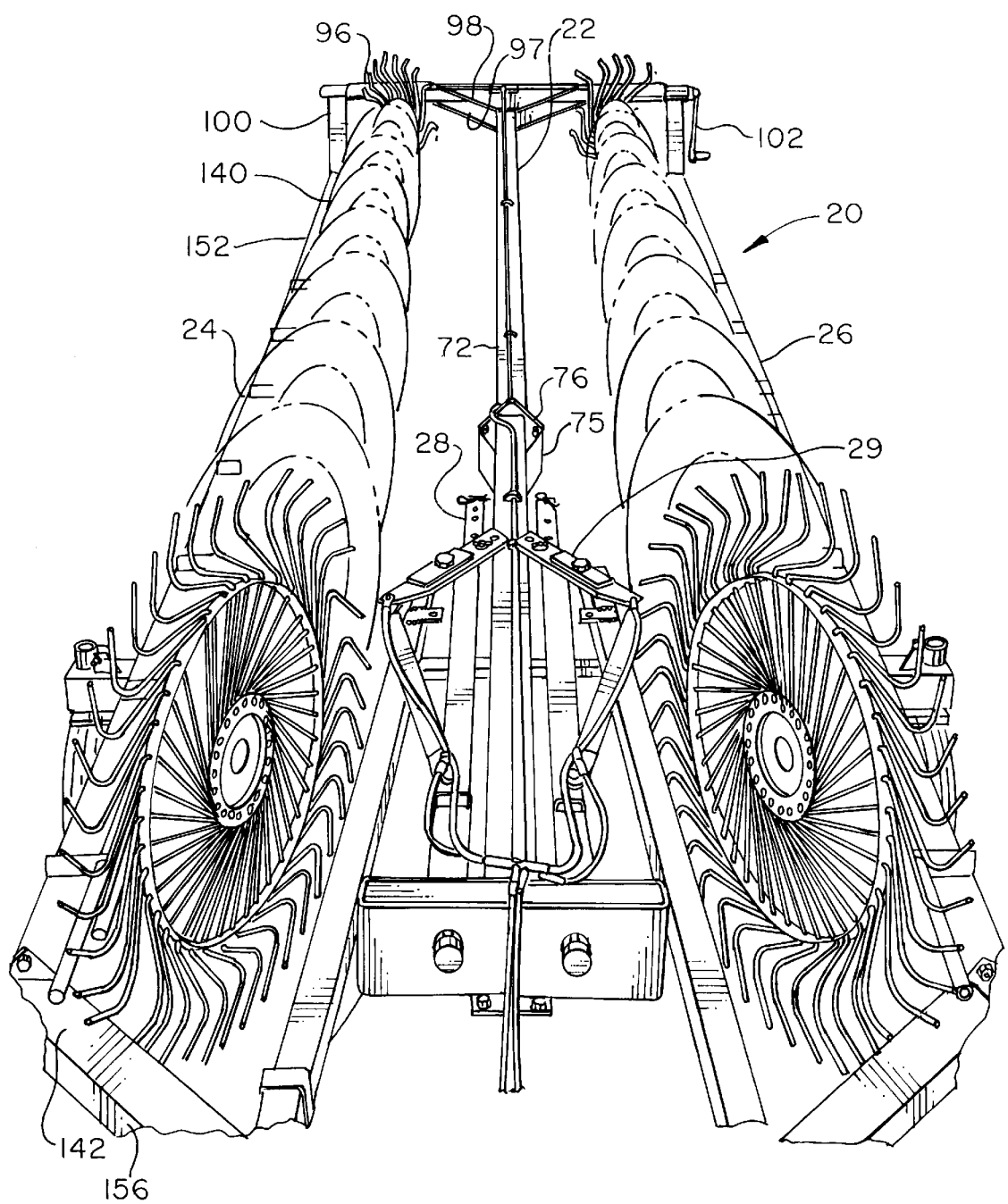
FIGS. 1a, b, and c are perspective views of a folding hay rake in transport position as seen looking rearward from near the front of the rake.

Overview of the Agricultural Implement In a preferred embodiment, a folding hay rake of is depicted in FIG. 1a at 20. The hay rake 20 includes a primary frame 22, a right secondary frame 24, and a left secondary frame 26. The secondary frames 24 and 26 may each occupy a transport position which is retracted relationship relative to the primary frame 22, as shown in FIGS. 1a, b, and c. Alternatively, the secondary frames 24 and 26 may also each occupy deployed positions or relationships relative to the primary frame 22. Pivotal motion to deploy and retract the secondary frames 24 and 26 relative to the primary frame 22 is imparted by right and left deployment spreader assemblies 28 and 29, respectively.

Primary Frame

Figure 1B:
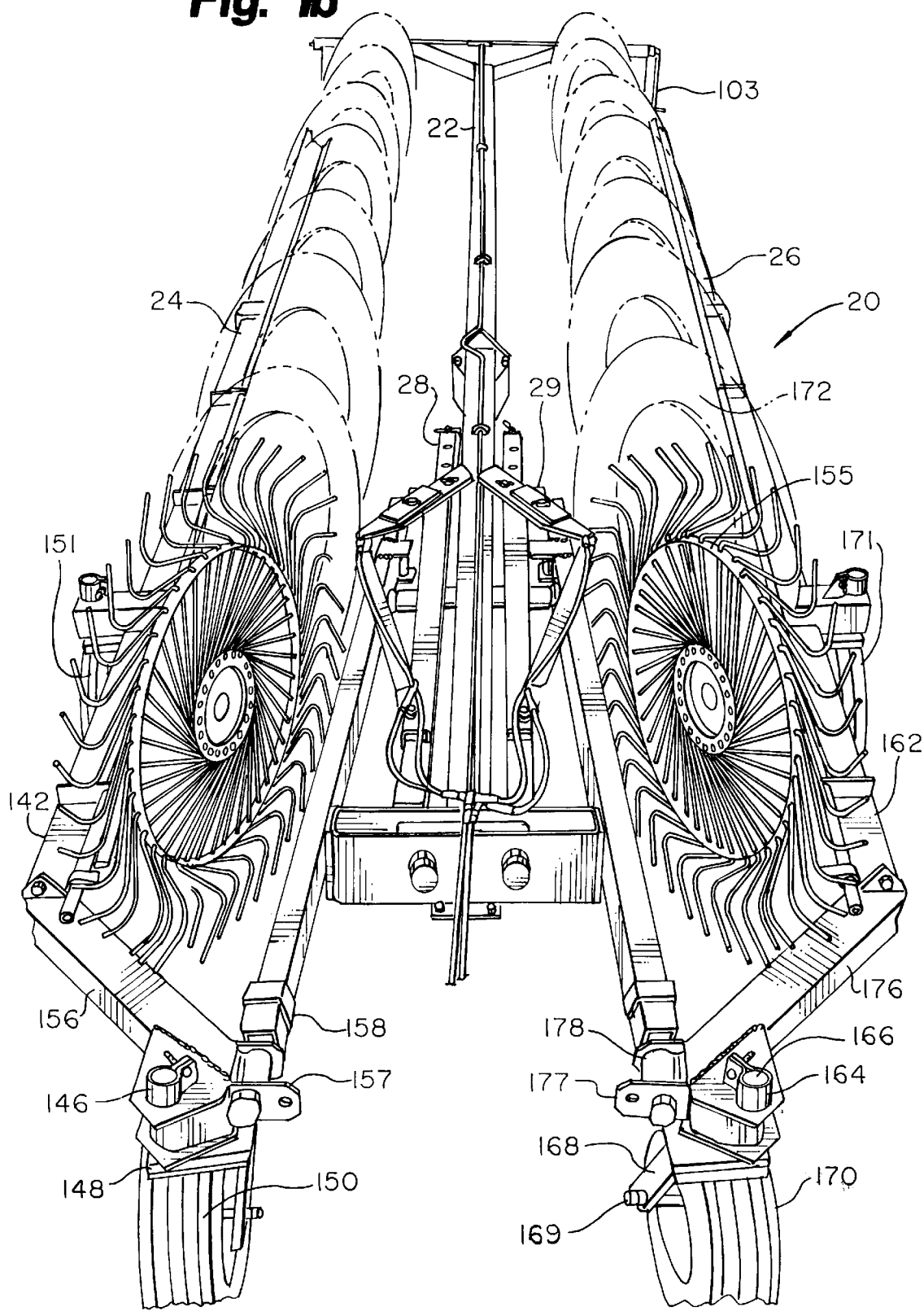
Figure 1C:
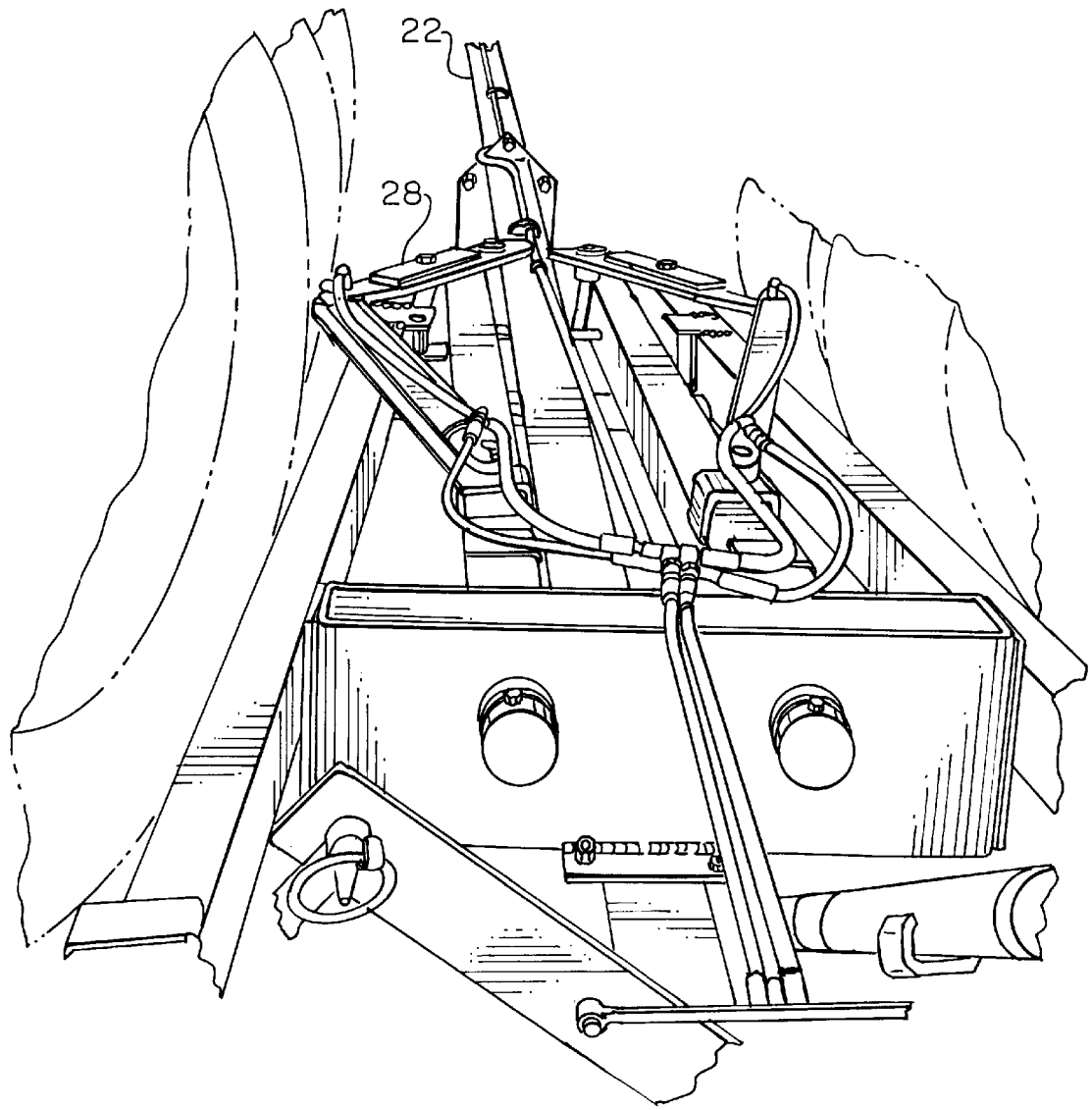
Figure 4A:
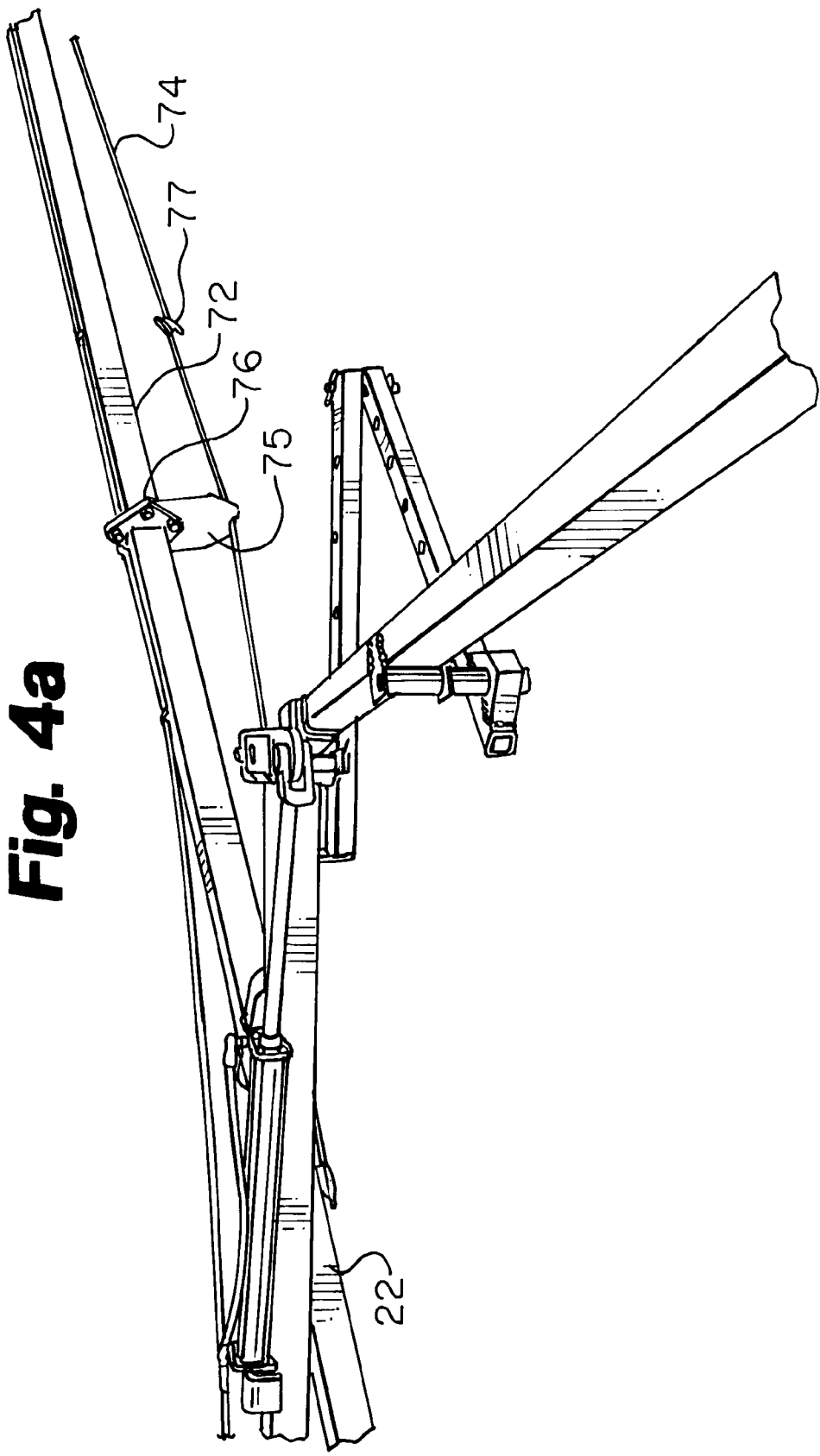
FIGS. 4a, b and c are fragmentary perspective views thereof, as seen from near the left side and above, and showing the right side of the rake in a partially deployed or intermediate position.
Figure 4B:
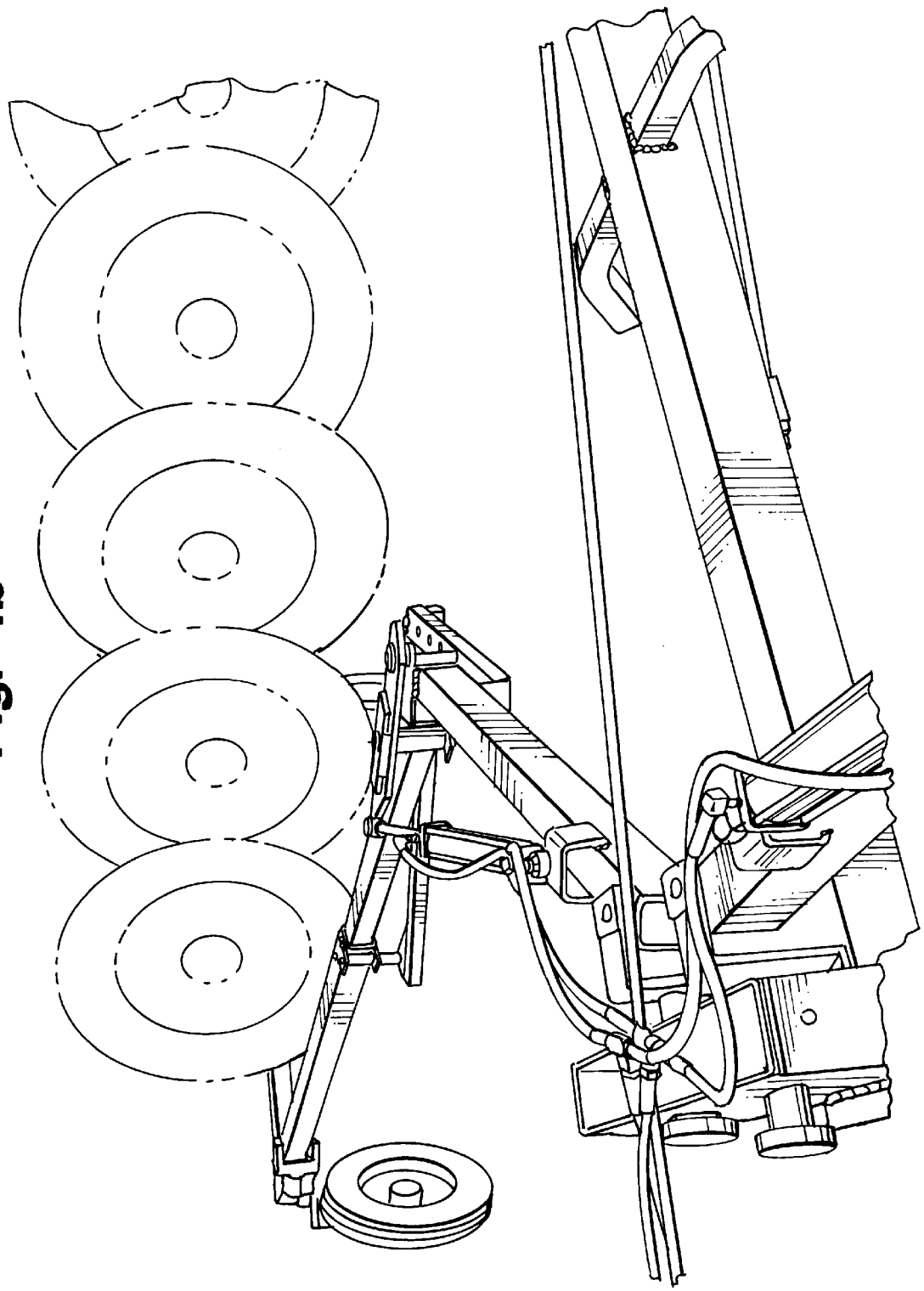
Figure 4C:
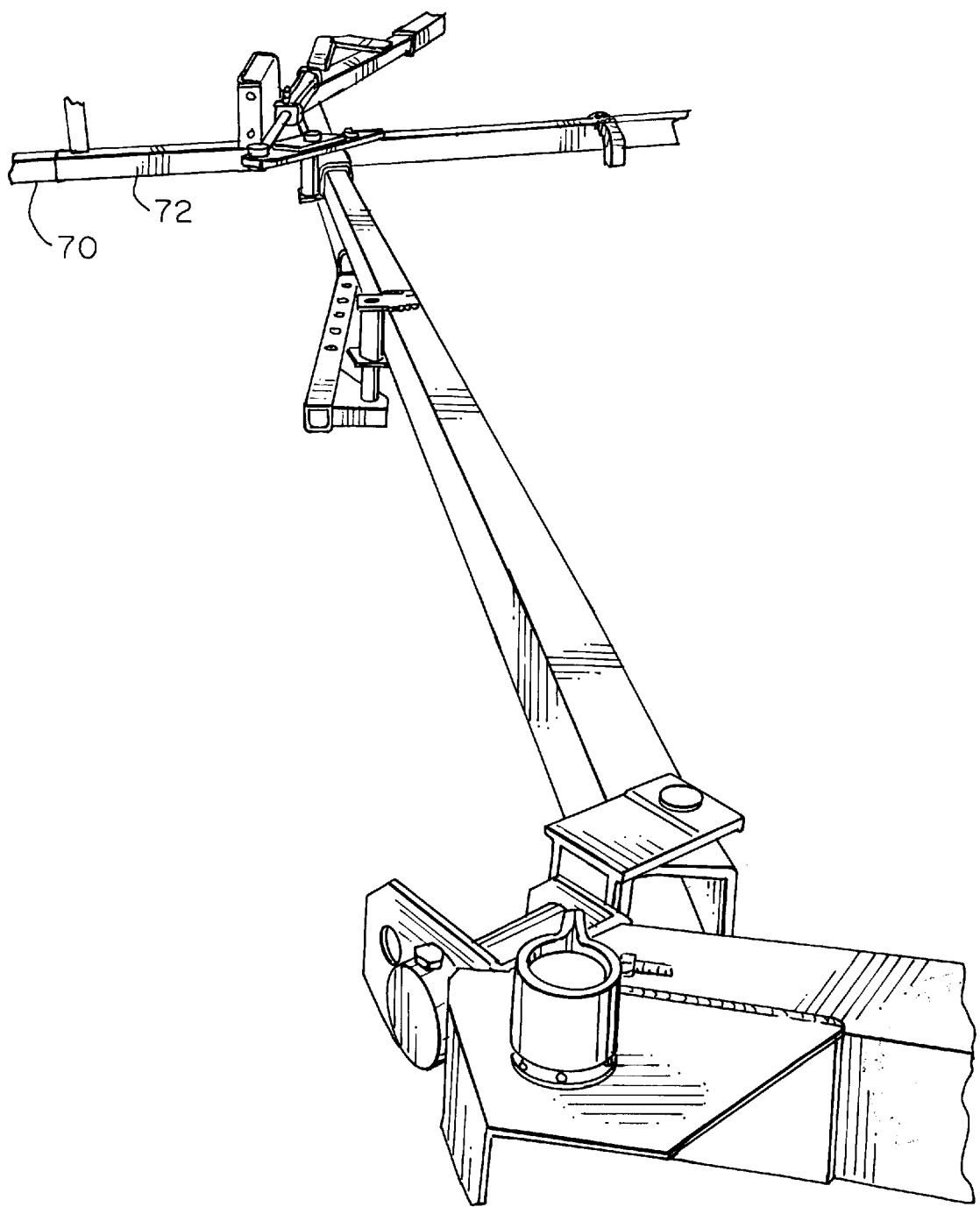
Figure 5:
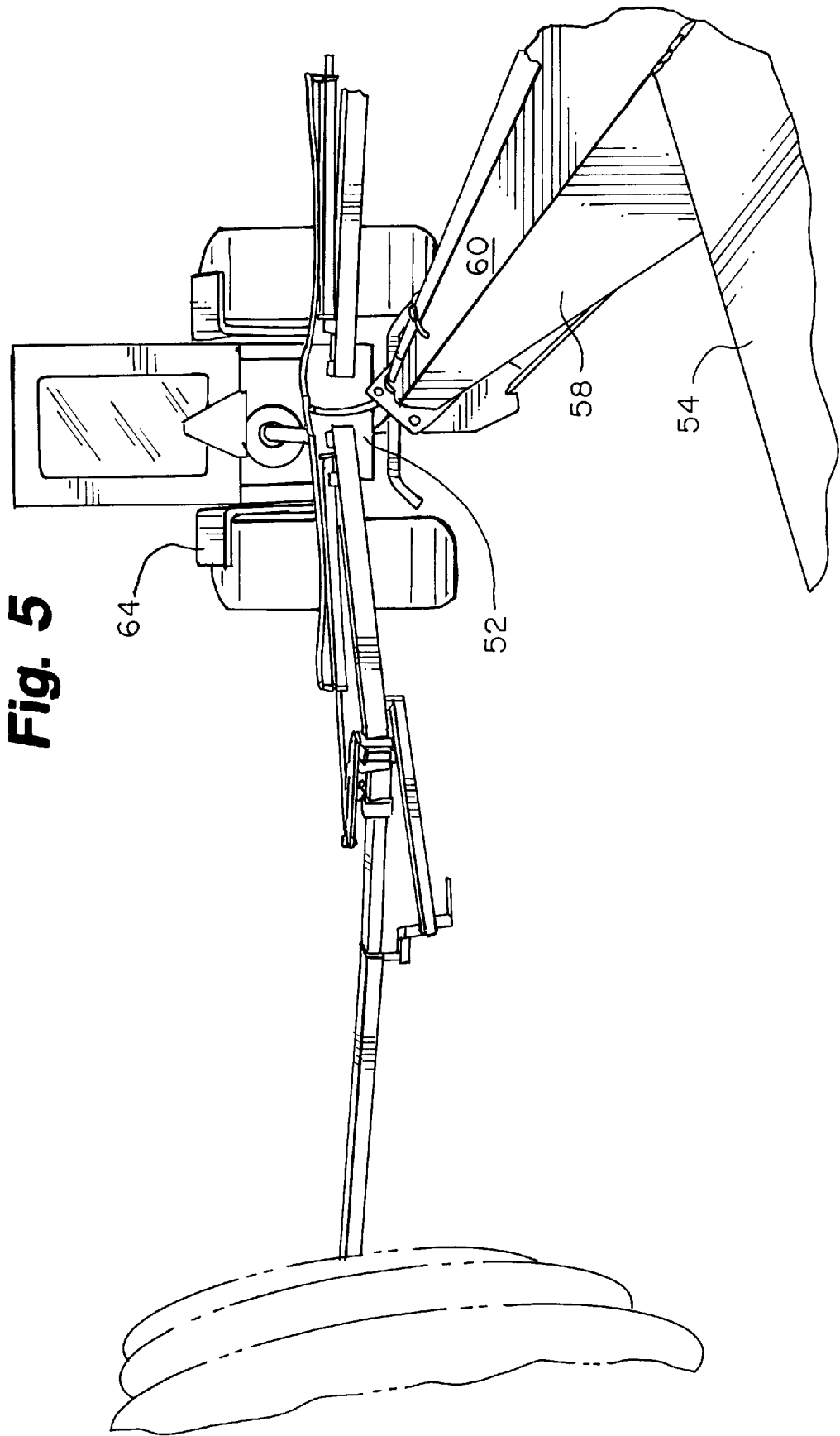
FIG. 5 is an fragmentary perspective view of the rake of FIG. 1 seen from above the rear and looking forward.
Figure 7B:
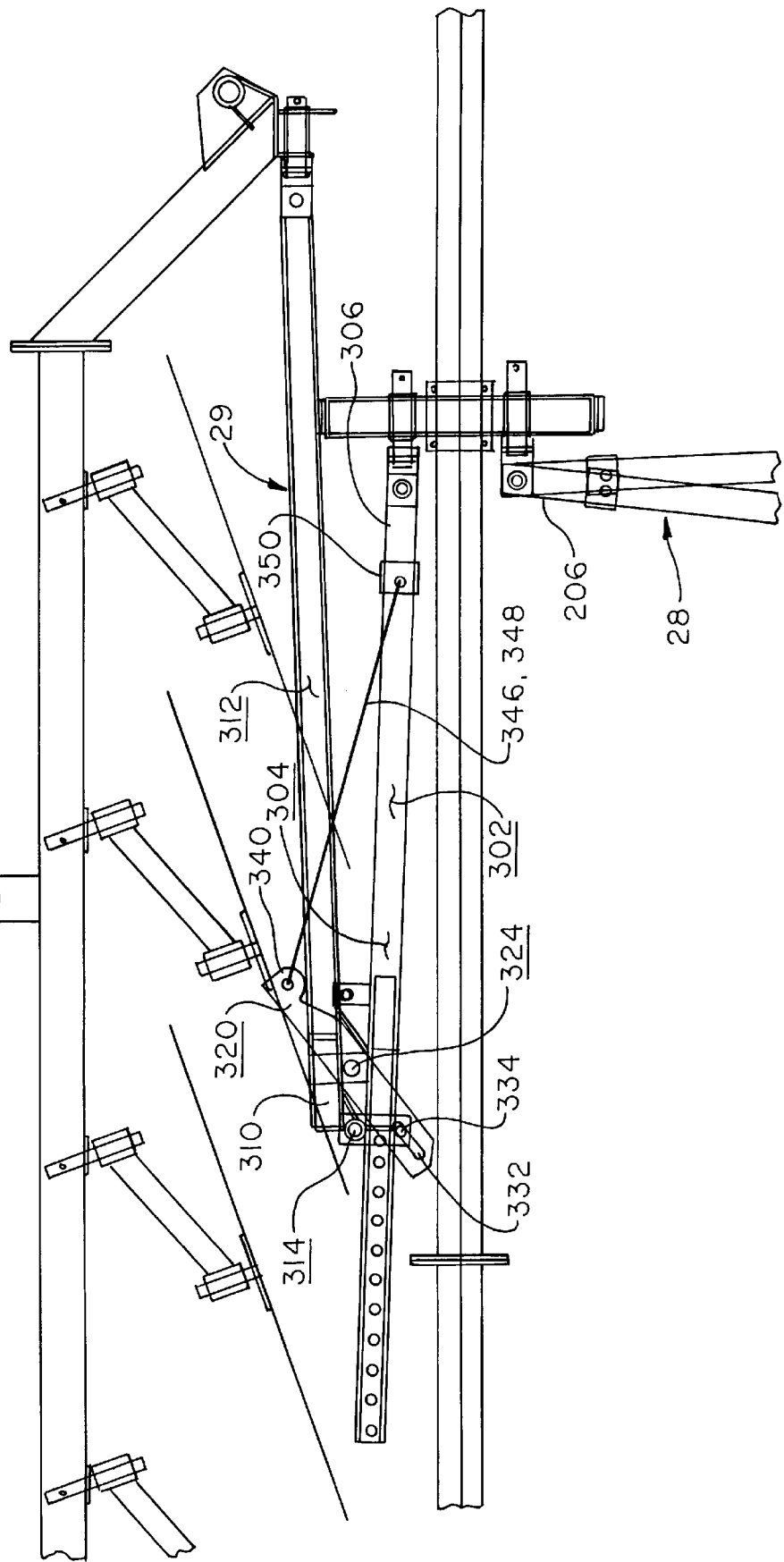
FIGS. 7a and b are top and bottom fragmentary schematics of the right and left deployment arms, respectively.

The primary frame 22, as depicted in FIGS. 1 and 5, has a front end 52, a rear end 54, a right side 56, a left side 58, a top side 60, and a bottom side (opposite the top side 60.) At the front end 52, a typical agricultural hitch (i.e. top and bottom spaced apart leaves with co-aligned apertures) provides reversible attachment of the implement 20 to a towing vehicle 64. Preferably, the tow vehicle 64 has a compatible draw bar with an appropriate aperture to accept a hitch pin when interposed in the hitch. Most preferably, when the implement 20 is to be operated, the tow vehicle 64 is a farm tractor or equivalent device with the additional capability to provide quick connections to the intake and outlet of a hydraulic fluid pressuring system, as much of the implement 20 is preferably hydraulically operated.

However, it should be noted that for transport, in the retracted position, the implement 20 may be towed by light duty trucks lacking such hydraulic systems, and may travel on smooth highways at rates of speed up to roughly 50 miles per hour. The hitch is attached to a tongue 70 which ascends gradually rearward from the relatively low elevation of the hitch and the draw bar of tow vehicle 64 to an elevation roughly chest high and connects to the rear end 54 of the primary frame 22. Preferably the tongue 70 is tubular steel and also serves as a spine 72 for the primary frame 22.

The spine 72 is further stiffened by a rod or cable stiffener 74 which is attached at two longitudinally separated points, behind the hitch and near the rear end 54 of the spine 72. A spacer plate 75 connects and separates the stiffener 74 from the spine 72 at a position roughly midway between the hitch at the front end 52 and rear end 54 of the primary frame 22. This stiffener 74 inhibits vertical vibration and bending in the spine 72, a particular advantage when raking forage in rough fields. Preferably, the stiffener 74 includes a length adjustment 77 to fine tune the tension of the stiffener 74. Preferably, the spine 74 is formed of two separable segments and the spacer plate 75 may be bolted in place at a fastened junction 76 in the spine 72. Such an arrangement facilitates assembly and disassembly of the spine 74 for economical commercial shipping and saves weight in the overall rake 20.

A transport bracket 78 is transversely mounted on the spine 72, at a location rearward of the connection of the deployment spreader assemblies 28 and 29 to the spine 72 and ahead of the spacer plate 75. The transport bracket 78 serves to slidably support the right and left deployment spreader assemblies 28 and 29 when the rake 20 is in the transport position, as shown in FIG. 1. Such support eliminates a potentially detrimental cantilevered condition and much of the associated potential stress and strain on connections of the deployment spreader assemblies 28 and 29 to the primary and secondary frames 22, 24, and 26. As shown in FIG. 3c, at the outboard ends of the transport bracket 78 are down-turned ends or ramps 80 which serve to intercept and slightly raise a central portion of the deployment spreader assembly 28 as the travel position is attained. When deployment begins, the supported central portion of the deployment spreader assembly 28 slides outward or outboard on the transport bracket 78 and away from the primary frame 22 and then subsequently slides down the ramp 80. Without the ramp 80, the deployment spreader 28 would drop suddenly during deployment and would be unable to dependably re-attain the support position upon the transport bracket 78 on retraction to the transport position.

Continuing the description of the primary frame 22 in a rearward direction, the spine 72 is connected to a crosstree 96 and that connection is strengthened by permanent attachment (i.e. welding) of both the spine 72 and the crosstree 96 to bottom gusset 97 and top gusset 98.

The crosstree 96, in turn, is supported by right post 100 and left post 102. Outboard and at the bottom of each of the posts 100 and 102 are right and left rear double wheel sets 104 and 106, respectively. Optionally, the spacing between the wheels 104 and 106 is adjustable, by means of a handcrank 103 driving a double threaded screw mechanism internal to the cross tree 96. These two wheel sets 104 and 106 are mounted on fixed axles, projecting outboard from the posts 100 and 102, and are oriented for forward travel of the implement 20. In an alternative embodiment, for smaller rakes, right and left single wheel assemblies can be employed instead of the multiwheel assemblies right and left to which are preferred to support larger primary frames, to reduce soil compaction, and/or provide additional or enhanced capability to travel over soft or sandy soils. On the forward side of each of the posts 100 and 102, intermediate the crosstree 96 and the respective wheels 104 and 106, are right and left vertical hinges 108 and 110, respectively. These vertical hinges 108 and 110 connect to and carry right and left secondary frames 24 and 26, respectively.

Right Secondary Frame

The right secondary frame 24 has an inboard end 140, connected to the right vertical hinge 108. A right bank of wheel rakes 152, preferably ground driven wheel rakes, is carried by the right secondary frame 24. When lowered into appropriate ground tension contact, each of the rakes of the right bank of wheel rakes 152 rake and rotate such that cut forage lying on the ground is raked toward the primary frame 22. In concert, as the bank of wheel rakes 152 simultaneously rotate and are towed forward, most cut forage encountered is raked into a windrow passing between the right rear wheel set 104 and the left rear wheel set 106. Further, the right bank of wheel rakes 152 may be raised or lowered relative to the right secondary frame 24 by a hydraulically powered rake actuator assembly 154. Banks of wheel rakes on secondary frames which may be raised and lowered, preferably hydraulically, are known in this art and the disclosures of U.S. Pat. Nos. 5,199,252 and 5,305,509, to Peeters, are incorporated herein by reference.

At an end of the right secondary frame 24, opposite from the inboard end 140, is the outboard end 142 and an outboard end frame 156 which is rigidly connected bent generally inward at about roughly 45 degrees to the outboard end 142 of the right secondary frame 24 as shown in FIGS. 1*a* and *b*. The outboard end frame 156 projects inboard, with reference to the transport position, or ahead, with reference to the deployed position, from the right secondary frame 24. A right transport link bracket 157, at the inboard terminus of the right outboard end frame 156 can reversibly accept a pin to reversibly link the both right and left secondary frames 24 and 26 to the primary frame 22 during transport. Storage is provided for the pin adjacent the right transport link bracket when the pin is removed from the right transport link bracket and the implement 20 is deployed for use. On the front or outboard side of the outboard end frame 156 is a pivot bracket 144, housing a vertical pivot 146 atop a raked fork 148, a horizontal axle 149 and a right outboard wheel 150, which is free to caster or serve as an orbital idler wheel. On each of the frames 24 and 26, a second intermediate castered wheel 151, spaced apart and rearward from the end also serves to assist in supporting the frames 24 and 26. In alternative embodiments, multiwheel assemblies may be substituted for the individual single castered wheels or in the case of smaller rakes, the second castered intermediate wheel might be eliminated. The wheel 150 is self steering and supports the outboard end frame 156 and, in turn, the outboard end 142 of the right secondary frame 24.

Pivotally mounted at an intermediate position on the inboard end of the right outboard end frame 156 is a right connector frame 158 which connects to the right deployment spreader assembly 28. The right connector frame 158 can pivot about a horizontal pivot axis situated at an intermediate point on the connector frame 158.

Left Secondary Frame

The left secondary frame 26 is generally a mirror image of the right secondary frame 24 and has an inboard end 160, connected to the left vertical hinge 110. A left bank of wheel rakes 172, preferably ground driven wheel rakes, is carried by the left secondary frame 26. When lowered into appropriate ground tension contact, each of the rakes of the left bank of wheel rakes 172 rake and rotate such that cut forage lying on the ground is raked toward the primary frame 22. In concert, as the bank of wheel rakes 172 simultaneously rotate and are towed forward, most cut forage encountered is raked into a windrow passing between the right rear wheel 104 and the left rear wheel 106. Further, the left bank of wheel rakes 172 may be raised or lowered relative to the left secondary frame 26 by a hydraulically powered rake actuator assembly 155. Banks of wheel rakes on secondary frames which may be raised and lowered, preferably hydraulically, are known in this art and the disclosures of U.S. Pat. Nos. 5,199,252 and 5,305,509, to Peeters, as mentioned previously, are incorporated herein by reference.

At an end of the left secondary frame 26, opposite from the inboard end 160, is the left outboard end 162 and a left outboard end frame 176 which is rigidly connected, bending generally at roughly about a 45 degree angle to the outboard end 162 of the left secondary frame 26, as shown in FIG. 1*b*. The outboard end frame 176 projects inboard, with reference to the transport position, or ahead, with reference to the deployed position, from the left secondary frame 26. A left transport link bracket 177, at the inboard terminus of the left out outboard frame 176 provides, a reversible pin connection to the right transport link bracket 177 and the primary frame 22 during transport. A storage location for the pin is provided adjacent the link bracket 177 when the pin is not in use. On the front or outboard side of the outboard end frame 176 is a pivot bracket 164, housing a vertical pivot 166 atop a raked fork 168, a horizontal axle 169 and a left outboard wheel 170, which, like right outboard wheel 150, is free to caster or serve as an orbital idler wheel. A second castered wheel 171, spaced apart from the outboard wheel 170, assists in supporting the left secondary frame 26. As mentioned earlier, in an alternative embodiment, multiwheel assemblies may be substituted for a single castered wheel in larger rakes or the additional castered wheels at intermediate locations along shorter secondary frames may be eliminated for smaller rakes. In such alternative embodiments, a mirror image arrangement is envisioned as preferable, but not absolutely required, in order to benefit from the present invention. The left outboard wheel 170 is self steering and supports the left outboard frame 176 and, in turn, the left outboard end 162 of the left secondary frame 26.

Pivotally mounted at an intermediate position on the inboard end of the outboard end frame 176 is a left connector frame 178 which connects to the left deployment spreader assembly 29. The left connector frame 178 can pivot about a horizontal pivot axis situated at an intermediate point on the connector frame 178.

Deployment Spreader Assemblies

The right deployment spreader assembly 28 includes a first or inboard arm 202 having a first end 204 and a second end 206. The first end 204 of the inboard arm 202 has a tab 205 which is pivotally attached to a tab 211 at the first end 210 of a second or outboard arm 212 at a first vertical pivot 214. An elbow member 220 is also pivotally attached to a second tab 222 on the outboard arm 212 through a second vertical pivot 224. The second tab 222 is spaced longitudinally apart from the first tab 211 at the first end 210 of the outboard arm 212. The second vertical pivot is situated at an intermediate point on the elbow member 220. At a first end 230 of the elbow member 220 is a slot 232 extending generally longitudinally on the elbow member 220. Captured in the slot 232 is a lug 234 projecting vertically and upward from adjacent the first end 204 of the inboard arm 202. Lug 234 moves longitudinally, with respect to the elbow member 220, within slot 232 as the deployment spreader assembly 28 operates. When the inboard arm 202 and the outboard arm 212 are positioned generally parallel to each other, as when the right secondary frame 24 of rake 20 is in the transport position, the lug 234 resides within the slot 232 at a location toward second pivot 224. When the inboard arm 202 and outboard arm 212 are positioned at roughly right angles to each other, as when the right secondary frame is in transition, half way toward being deployed or retracted, the lug 234 is positioned within the slot 232 closer to the first end 230 of the elbow member 220. When the inboard arm 202 and outboard arm 212 are positioned in a roughly collinear relationship to each other and the right secondary frame is fully deployed, the lug 234 is positioned within the slot 232 closer to the second pivot 224 than to the first end 230 of the elbow member 220.

The opposite end 240 of the elbow member 220 is pivotally connected to the terminal clevis of a hydraulic ram 246 driven by a hydraulic cylinder 248 which in turn is pivotally attached at an intermediate point 250 on the inboard arm 202. From an initial retracted position, hydraulic extension of the ram 246 from the cylinder 248 moves the end 240 of the elbow member 220, forcing the outboard arm 212 to pivot about the first vertical pivot 214. During this initial motion, the end 240 of the elbow member 220 is angularly disposed to and situated slightly outboard from the outboard arm 212. As the extension motion continues, the end 240 of the elbow member 220 moves outboard and reorients slightly, while the outboard arm 212 beneath it moves outboard and reorients significantly, such that it becomes temporarily parallel to the elbow member 220. As the extension motion is completed, the outboard arm 212 moves from generally parallel to a new angular relationship with the elbow member 220. Finally, with the outboard arm 212 generally coaligned with the inboard arm 202, the end 240 of the elbow member 220 resides in front of the outboard arm 212 and further extension of the hydraulic ram and cylinder tends to be limited by abutment of the ends 204 and 210 of the arms 202 and 212 near the first pivot 214. In effect, the elbow member 230 tends to lock the inboard arm 202 and the outboard arm 212 in a generally co-aligned and fully extended relationship, corresponding to a fully deployed right secondary frame 24. This locking capability is due to a near linear geometry, including a slight overcenter relationship, between the first pivot 214, the second pivot 224 and the lug 234 within slot 232. Another significant feature of the deployment spreader assembly 28 is the relatively short travel (i.e. extension or retraction) needed between the hydraulic ram and cylinder 246 and 248 respectively. This feature saves both manufacturing cost and operating cost in reducing the weight of rake 20.

The end 206 of the inboard arm 202 is attached to an intermediate position on the tongue 70 so as to accommodate angular motion in two dimensions. Specifically, a pivot pin 250 is carried in an orientation generally horizontal and generally parallel to the longitudinally extending tubular spine 72 of the primary frame 22 by a pivot housing 252. At the rearward terminus of the pivot pin 250 is a pivot connection 254 to the end 206 of the inboard arm 202. The pivot connection 254 is generally perpendicular to the pivot pin 250 and tends toward a generally vertical orientation but can accommodate substantial deviation from its typical vertical orientation in response to flexing caused by travel over rough field terrain or vertical motion at the far end of the deployment spreader assembly 28.

Fine control of the extent of deployment is also a significant aspect of the present invention. The outboard arm 212 of the right deployment assembly is telescopic, with an outside slider portion 212a attached to the right secondary frame 24 and an inside slider portion 212b carried telescopically within and attached to the inboard arm 202. Adjacent the telescopic entrance of the inside slider 212b into the outside slider 212a, the outside slider 212a has a pivotable bracket 216 and an adjustment leg 217 with an array of pin receiving holes 218a. Projecting distally or outward from the underside of the inboard arm 202 is a rigidly connected width adjustment link 219 also having an array of pin receiving holes 218b. A moveable pivot pin 221 connects the adjustment leg 217 with the adjustment link 219 by connecting a single pin receiving hole selected from the array 218a with a single pin receiving hole selected from the array 218b. This pin hole selection from each array 218a and 218b is most easily accomplished when the rake 20 is in the underployed or travel position. In such a position, the adjustment leg 217 can be pivoted slightly on its bracket attachment to the outside slider 212a to bring successive pairs of pin receiving holes of each array 218a and 218b into temporary alignment, for easy selection of width of deployment. Of course, it is possible, though less convenient, to remove the moveable pivot pin 221 when the right secondary frame is deployed or partially deployed, move the secondary frame 24 toward or away from the primary frame 22 and replace the pin 221 when a new pair of holes come into alignment. However, the pin receiving holes of each array 218a and 218b are most preferably utilized in successive pairs, such that a fully retracted right secondary frame 24 achieves the appropriate travel position relationship with the primary frame 22.

The end 280 of the telescoping outboard arm 212, specifically the outside slider 212a, is attached to the connector frame 158. Specifically, the end 280 is the projecting terminus of the outside slider 212a. Selection of the pair of successive pin receiving holes of the arrays 218a and 218b furthest located from the first pivot 214 provide the widest or more open deployment position, as depicted in FIG. 6c thereby allowing a wider portion of a field to be raked. Selection of the successive pair of pin receiving holes closest to the first pivot 214 holds the right secondary frame 24 at a slightly closed or more narrow deployed position, depicted in FIG. 6a, thereby allowing a slightly narrower portion of a field to be raked.

The left deployment spreader assembly 29 is a mirror image of the right deployment spreader assembly 28. The two deployment spreader assemblies 28 and 29 preferably function independently from each other, such that either one or both may be deployed or retracted. Briefly, the left deployment spreader assembly has a first or inboard arm 302 having a first end 304 and a second end 306. The first end 304 of the inboard arm 302 has a tab 305 which is pivotally attached to a tab 311 at the first end 310 of a second or outboard arm 312 at a first vertical pivot 314. An elbow member 320 is also pivotally attached to a second tab 322 on the outboard arm 312 through a second vertical pivot 324. The second tab 322 is spaced longitudinally apart from the first tab 311 at the first end 310 of the outboard arm 312. The second vertical pivot 324 is situated at an intermediate point on the elbow member 320. At a first end 330 of the elbow member 320 is a slot 332 extending generally longitudinally on the elbow member 320. Captured in the slot 332 is a lug 334 projecting vertically and upward from adjacent the first end 304 of the inboard arm 302. Lug 334 moves longitudinally, with respect to the elbow member 320, within slot 332 as the left deployment spreader assembly 29 operates. When the inboard arm 302 and the outboard arm 312 are positioned generally parallel to each other, as when the left secondary frame 26 of rake 20 is in the transport position, the lug 334 resides within the slot 332 at a location toward second pivot 324. When the inboard arm 302 and outboard arm 312 are positioned at roughly right angles to each other, as when the right secondary frame is in transition, half way toward being deployed or retracted, the lug 334 is positioned within the slot 332 closer to the first end 330 of the elbow member 320. When the inboard arm 302 and outboard arm 312 are positioned in a roughly collinear relationship to each other and the left secondary frame is fully deployed, the lug 334 is positioned within the slot 332 closer to the second pivot 324 than to the first end 330 of the elbow member 320.

The opposite end 340 of the elbow member 320 is pivotally connected to the terminal clevis of a hydraulic ram 346 driven by a hydraulic cylinder 348 which in turn is pivotally attached at an intermediate point 350 on the inboard arm 302. From an initial retracted position hydraulic extension of the ram 346 from the cylinder 348 moves the end 340 of the elbow member 320, forcing the outboard arm 312 to pivot about the first vertical pivot 314. During this initial motion, the end 340 of the elbow member 320 is angularly disposed to and situated slightly outboard from the outboard arm 312. As the extension motion continues, the end 340 of the elbow member 320 moves outboard and reorients slightly, while the outboard arm 312 beneath it moves outboard and reorients significantly, such that it becomes temporarily parallel to the elbow member 320. As the extension motion is completed, the outboard arm 312 moves from generally parallel and to a new angular relationship with the elbow member 320. Finally, with the outboard arm 312 generally coaligned with the inboard arm 302, the end 340 of the elbow member 320 resides in front of the outboard arm 312 and further extension of the hydraulic ram and cylinder 346 and 348 tends to be limited by abutment of the ends 304 and 310 of the arms 302 and 312 near the first pivot 314. In effect, the elbow member 320 tends to lock the inboard arm 302 and the outboard arm 312 in a generally co-aligned and fully extended relationship, corresponding to a fully deployed left secondary frame 26. This locking capability is due to a near linear geometry, including a slight overcenter relationship, between the first pivot 314, the second pivot 324 and the lug 334 within slot 332. Another significant feature of the deployment spreader assembly 29 is the relatively short travel (i.e. extension or retraction) needed between the hydraulic ram and cylinder 346 and 348 respectively. This feature saves both manufacturing cost and operating cost in reducing the weight of rake 20.

The end 306 of the inboard arm 302 is attached to an intermediate position on the tongue 70 so as to accommodate angular motion in two dimensions. Specifically, a pivot pin 350 is carried in an orientation generally horizontal and generally parallel to the longitudinally extending tubular spine 72 of the primary frame 22 by a pivot housing 352. At the rearward terminus of the pivot pin 350 is a pivot connection 354 to the end 306 of the inboard arm 302. The pivot connection 354 is generally perpendicular to the pivot pin 350 and tends toward a generally vertical orientation but can accommodate substantial deviation from its typical vertical orientation in response to flexing caused by travel over rough field terrain or vertical motion at the far end of the deployment spreader assembly 29.

Fine control of the extent of deployment is also a significant aspect of the present invention. The outboard arm 312 of the right deployment assembly is telescopic, with an outside slider portion 312a attached to the left secondary frame 26 and an inside slider portion 312b carried telescopically within and attached to the inboard arm 302. Adjacent the telescopic entrance of the inside slider 312b into the outside slider 312a, the outside slider 312a has a pivotable bracket 316 and an adjustment leg 317 with an array of pin receiving holes 318a. Projecting distally or outward from the underside of the inboard arm 302 is a rigidly connected width adjustment link 319 also having an array of pin receiving holes 318b. A moveable pivot pin 321 connects the adjustment leg 317 with the adjustment link 319 by connecting a single pin receiving hole selected from the array 318a with a single pin receiving hole selected from the array 318b. This pin hole selection from each array 318a and 318b is most easily accomplished when the rake 20 is in the underployed or travel position. In such a position, the adjustment leg 317 can be pivoted slightly on its bracket attachment to the outside slider 312a to bring successive pairs of pin receiving holes of each array 318a and 318b into temporary alignment, for easy selection of width of deployment. Of course, it is possible, though less convenient, to remove the moveable pivot pin 321 when the left secondary frame is deployed or partially deployed, move the secondary frame 26 toward or away from the primary frame 22 and replace the pin 321 when a new pair of holes come into alignment. However, the pin receiving holes of each array 318a and 318b are most preferably utilized in successive pairs, such that a fully retracted left secondary frame 26 achieves the appropriate travel position relationship with the primary frame 22.

The end 380 of the telescoping outboard arm 312, specifically the outside slider 312a, is attached to the connector frame 176. Specifically, the end 380 is the projecting terminus of the outside slider 312a. Selection of the pair of successive pin receiving holes of the arrays 318a and 318b furthest located from the first pivot 314 provide the widest or more open deployment position, thereby allowing a wider portion of a field to be raked. Selection of the successive pair of pin receiving holes closest to the first pivot 314 holds the left secondary frame 26 at a slightly closed or more narrow deployed position, thereby allowing a slightly narrower portion of a field to be raked.

Operation

The function of the present invention may be understood by first considering deployment of the right secondary frame 24 from a transport condition. Hydraulic fluid under pressure is applied to cylinder 248 so as to cause ram 246 to extend. This pushes end 240 of the elbow member 230 rearward and outboard. However, the force is transmitted by the elbow member to the second vertical pivot 224 and the lug 234 in slot 232. This in turn causes outboard arm 212 to pivot relative to inboard arm 202 about first vertical pivot 214. However, because the end 206 is pivotally held in position along the primary frame 22 and because the outboard arm 212 and more specifically the inside slider 212b and outside slider 212a, in combination with the selected wide or narrow pivot connection between receiving pin arrays 218a and 218b of leg 217 and link 219 will push the pivoting secondary frame 24, and define a particular pathway which must be followed, then both arms 202 and 212 begin to move in concert and initiate the deployment of the right secondary frame 24. Note that the path and ultimate full deployment, whether wide or narrow is strongly influenced by the removable pin 221 connecting a successive pair of pin receiving holes from the two arrays 218a and 218b. This becomes most apparent as the arms 212 and 202 become generally collinear and the leg and link 217 and 219 control the extent to which the telescopic outboard arm 212 pushes the secondary frame 24 outward. As noted earlier, the deployment spreader assembly also slides outboard, away from the primary frame 22, along transport support bracket 78 and down ramp 80. The deployment continues, typically with the caster wheel 150 both pivoting and rolling while supporting the frame 24. As the maximum extension is achieved and arms 202 and 212, more specifically outer and inner sliders 212a and 212b, all become coaligned and the ends 210 and 204 abut, the pivots 214, 224 and lug 234 in slot 232 briefly pass through a geometric linear alignment and then enter an over center relationship, which serves to effectively lock the arms 202 and 212 in position. This effectively serves to also lock the telescopic relationship of outside and inside sliders 212a and 212b. Retraction is effectively a reversal of the process, beginning with unlocking the arms 202 and 212 from the overcenter condition by hydraulic retraction of the ram 246 and ultimately completed with the deployment spreader assembly 28 sliding up ramp 80 and across bracket 78. If appropriate, the outboard frame 156 can be temporarily attached to the primary frame 22. Operation of the left deployment assembly is the mirror image.

The present invention enables a relatively light frame to form the implement 20, saving in manufacturing costs and weight relative to the heavier frame required in the absence of the present invention. The frame of the implement 20 gains the ability to flex in response to varying field surfaces due to the relatively light primary and secondary frames 22, 24, and 26 and the ability of the deployment spreader assembly 28 to accommodate angular motion in two dimensions at each end.

Because numerous modifications may be made of this invention without departing from the spirit thereof, the scope of the invention is not to be limited to the single embodiment illustrated and described. Rather, the scope of the invention is to be determined by appended claims and their equivalents.

What is claimed is:

1. A folding hay rake, comprising:
    a primary frame, having a forward end for attachment to a towing vehicle and a rear end opposite the forward end;
    a secondary frame pivotally attached to the primary frame adjacent the rear end;
    non-linearly acting deployment spreader means, pivotally attached to the primary and secondary frames, for pivoting the secondary frame relative to the primary frame, the deployment spreader means including:
        a first arm,
        a telescopic second arm pivotally connected to the first arm,
        an elbow member slidably and pivotally attached to the first arm and pivotally attached to the second arm,
        means for pivoting the elbow member to pivot the first arm relative to the second arm, the means for pivoting being pivotally coupled to a distal end of the elbow member, and
        means for controlling the telescopic second arm to achieve a desired length of telescopic action, the means for controlling being operably coupled.

2. The folding hay rake of claim 1 and further including:
    a second secondary frame, pivotally attached to the primary frame opposite the first secondary frame; and
    a second deployment spreader means for pivoting the second secondary frame relative to the primary frame.

3. The folding hay rake of claim 1 and wherein the means for moving the elbow member includes a hydraulic cylinder and ram.

4. The folding hay rake of claim 1 and wherein the deployment spreader means includes an overcenter condition when the first arm and the second arm are co-aligned.

5. The folding hay rake of claim 1 and wherein the means for controlling the telescopic second arm includes selectable successive pairs of pin receiving holes arrayed respectively upon a leg and link combination of the deployment spreader means.

* * * * *